(No Model.)
G. FLOOD.
PRICE SCALE.
No. 559,374. Patented May 5, 1896.
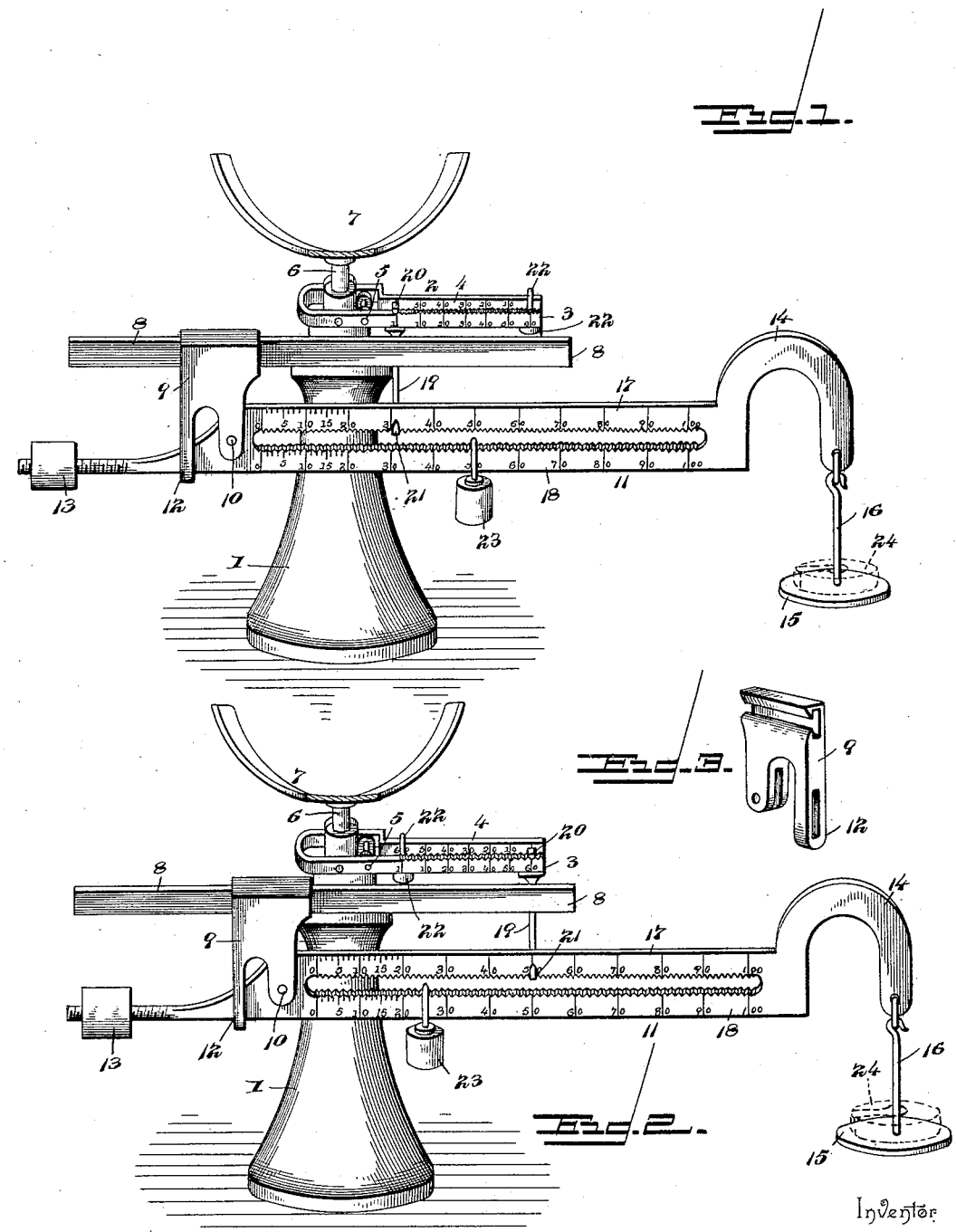
Witnesses
E. K. Stewart
Inventor
Gustaf Flood
By his Attorneys.
C A Snow & Co.

UNITED STATES PATENT OFFICE.

GUSTAF FLOOD, OF COKATO, MINNESOTA.

PRICE-SCALE.

SPECIFICATION forming part of Letters Patent No. 559,374, dated May 5, 1896.

Application filed October 31, 1893. Serial No. 489,615. (No model.)

*To all whom it may concern:*

Be it known that I, GUSTAF FLOOD, a citizen of the United States of America, residing at Cokato, in the county of Wright and State of Minnesota, have invented certain new and useful Improvements in Scales, of which the following is a specification, reference being had to the accompanying drawings.

My invention relates to scales of the class known as "price-scales," wherein the price of a certain quantity of a substance or material or the weight or amount thereof for a given price is indicated; and the object in view is to provide such a construction and arrangement of parts as to enable the adjustment of the apparatus to agree with the given rate and price to be accomplished by the movement of the minimum number of members.

Further objects and advantages of this invention will appear in the following description, and the novel features thereof will be particularly pointed out in the appended claims.

In the drawings, Figure 1 is a perspective view of a scale embodying my invention, showing the parts adjusted to weigh an article of which the rate is thirty cents per pound and of which it is desired to weigh fifty cents' worth. Fig. 2 is a similar view, partly broken away, showing the parts for weighing or measuring bushels of sixty pounds to the bushel, the rate per bushel of the article to be weighed being fifty cents and the amount wanted being twenty-five cents' worth. Fig. 3 is a detail view of the scale-beam-supporting bracket detached.

Similar numerals of reference indicate corresponding parts in all the figures of the drawings.

1 designates a standard, upon the upper end of which is pivotally mounted a balance-beam 2, having parallel arms or members 3 and 4, which are graduated in opposite directions, the arm 3 being graduated from "0" to "60," beginning at its inner end, and the arm 4 being similarly graduated, beginning at its outer extremity. The balance-beam is pivoted at 5 to the standard, and connected to and supported by the inner end or short arm of the balance-beam is a weight-supporting rod 6 for communicating the weight of the article to be weighed to the balance-beam. In the construction illustrated this weight-supporting rod carries a spider 7, designed for the reception of a scoop.

Secured to the standard near the plane of the balance-beam is a fixed horizontal guide-bar 8, extending in opposite directions from the standard, and mounted upon this guide is a carrier or slide 9, adapted to be moved from one end thereof to the other and allowed to remain upon either side or in front of the standard. Pivotally connected, as at 10, to this carrier or slide is a scale-beam 11, the rear end of which passes through a limiting or guide loop 12 on the bracket and is fitted with a counterpoise 13, adjustably mounted upon said extremity of the scale-beam by means of screw-threads, as indicated in the drawings. The extremity of the long or main arm of the scale-beam is provided with an arched extension 14, from which is suspended a weight-supporting disk 15 by means of a link 16.

The scale-beam is longitudinally slotted in its main or body portion to form upper and lower bars 17 and 18, respectively, the former of which I will for convenience term the "rate-bar" and the latter the "price" or "weight" bar, the inner or contiguous edges of said rate and price bars being spaced apart and serrated. These parallel bars, comprising the body portion of the scale-beam, are graduated to indicate parts of a unit of currency, and in the construction illustrated said graduations extend from "0" to "100," the corresponding graduations upon the two bars being arranged in the same vertical planes.

An index or pointer 19 is suspended by means of a balance-point 20 at its upper end upon the front arm 3 of the balance-beam, and it is provided at its lower end with an indicating-point 21, which is adapted to be arranged opposite a predetermined graduation of the upper or rate bar 17 of the scale-beam. An equalizing-poise 22 is arranged upon the rear arm 4 of the balance-beam, and is adjustable thereon to suit the position of the index or pointer, as hereinafter fully explained, and a weighing-poise 23 is arranged upon the lower or price bar 18 of the scale-beam.

This being the construction of the improved scale, the operation thereof is as follows: The index or pointer, when it is desired to measure pounds, should be arranged with its upper or balance point 20 upon the graduation "1" of the front arm of the balance-beam, thus indicating that the unit of measure is a pound, and the scale-beam should be adjusted longitudinally to bring it to such a position that the upper or rate bar 17 will engage the indicating-point 21 at a graduation corresponding in numerical value with the price per pound (or weight-unit) of the article to be weighed, such adjustment being accomplished by sliding the scale-beam carrier upon the guide 8. In Fig. 1 the index is shown with its upper point in engagement with the notch opposite the numeral "1" on the front arm of the balance-beam and its lower point in engagement with the notch opposite the graduation "30" of the upper bar of the scale-beam. With this arrangement of parts the disposition of the poise 23 upon the graduation "30" of the price-bar 18 would indicate that thirty cents' worth of an article worth thirty cents per pound, or, in other words, one pound of the article, would be required to depress the connecting-rod 6, and hence the short arm of the balance-beam; but in the drawings, Fig. 1, I have shown the poise 23 opposite the graduation "50" of the price-bar, and hence it is obvious that more than a pound of the article of which the price is thirty cents per pound will be necessary to depress the short arm of the balance-beam, and the amount in excess of one pound will be exactly proportionate to the excess of fifty cents over the price per pound of the article to be weighed, or the excess of fifty cents over thirty cents. In this way any desired quantity of the article at the price named can be weighed within an aggregate price of one dollar on a scale constructed in accordance with the drawings; and if it is desired to weigh an amount of the article costing more than one dollar it is necessary to apply a weight to the weight-supporting disk 15, such a weight being shown in dotted lines at 24. This weight is so proportioned as to be equivalent in specific gravity to the weighing-poise 23 when arranged at the "100" mark of the price-bar 18, and hence after applying said weight 24 the amount in excess of one dollar's worth may be indicated by the weighing-poise. For instance, with the weight 24 suspended by the weight-supporting disk the position of the weighing-poise 23 upon the weight-bar would indicate that a purchase of one dollar and fifty cents' worth of an article, at the rate of thirty cents per pound, is required.

When it is desired to measure an article by the bushel, a bushel of such article weighing a given amount, as sixty pounds, the index is moved outward upon the balance-beam until its upper point 20 is opposite the graduation "60," (thus indicating that the unit of measure is sixty pounds,) and the scale-beam is longitudinally adjusted to bring the lower point 21 of the index in engagement with the rate-bar 17 at the point indicating the price per bushel (or per sixty pounds) of the article to be measured. With the weighing-poise 23 arranged upon the graduation of the price-bar corresponding with the graduation of the rate-bar with which the lower point of the index is engaged the scale would measure one bushel of the article or material. Thus if the price per bushel of the article to be measured is fifty cents the lower point of the index will be engaged with the rate-bar opposite the graduation "50," and if the poise 23 were to be arranged opposite the graduation "50" of the price-bar it would indicate that fifty cents' worth of the article worth fifty cents per bushel is required; but in the drawings, Fig. 2, I have shown the poise 23 in engagement with the price-bar opposite the graduation "25," thereby indicating that twenty-five cents' worth of the article worth fifty cents per bushel is required. More than one dollar's worth of the article to be measured may be measured in the manner indicated with regard to weight by pound—namely, by applying weights equivalent to one dollar's worth to the weight-supporting disk 15 and indicating the excess over one dollars's worth by the arrangement of the weighing-poise 23 upon the price-bar.

In order to eliminate the factor of variations due to the adjustment of the index upon the balance-beam to accord with the weight-unit, I employ the equalizing-poise 22, which is arranged opposite a graduation on the rear arm of the balance-beam corresponding in numerical value with the index.

The weight of the poise 22 is equal to the weight of the index 19, and together they are approximately equal to the weight of the spider 7 and the supported scoop when said index and poise are located upon the corresponding graduations of the arms 3 and 4. In other words, for the index and poise 22 to properly counterbalance the weight of the attachments to the short arm of the balance-beam said index and poise must be arranged in corresponding positions upon their respective arms—that is, if the index is upon the graduation "1" of one arm the poise must be upon the graduation "1" of the other arm, and if the index is upon the graduation "20" the poise must be upon the graduation "20." If the index is arranged upon the graduation "60," as in measuring bushels of sixty pounds, the poise must be arranged upon the graduation "60" of the arm 4. When both the index and the poise are arranged upon the graduation "30" of the two arms, or at the centers thereof, the weight of the attachments to the short arm of the balance-beam is counterbalanced, and as either index or weight is moved outward or toward the extremity of its arm the other must be moved inward or toward the fulcrum. Hence in describing the poise 22 I have referred to it as an "equalizing-poise," in that it is adjustable in opposite directions to equalize the weight upon the balance-beam, and thus counterbalance the weight of the connections irrespective of the index.

When it is desired to weigh an article without reference to the price thereof, the point 20 at the upper end of the link 19 is arranged, as shown in Fig. 1, upon the graduation "1" of the balance-beam (the counterpoise 22 being disposed upon the corresponding graduation of the member 4 of said balance-beam) and the indicating-point 21 of the link is arranged in engagement with the graduation "1" of the rate-bar 17. One pound of the article will be weighed by arranging the weighing-poise 23 upon the graduation "1" of the price or weight bar 18, five pounds by arranging said poise 23 upon the graduation "5" of said price or weight bar, and so on up to one hundred. Articles of over one hundred pounds may be weighed by placing a loose weight, such as that shown at 24, upon the disk 15.

The advantage of arranging the rate and price (or weight) bars in parallel positions upon the same side of the fulcrum 10 of the scale-beam resides in the fact that the relative disposition of the point 21, which shows the rate, and the poise 23, which shows the price or weight, is facilitated. A comparative adjustment of the members 21 and 23 is attainable. In the same way a comparative adjustment of the point 20 and the counterpoise 22 is facilitated by providing the long arm of the balance-beam with parallel members 3 and 4, extending in the same direction from the fulcrum 5 of said beam.

Various changes in the form, proportion, and the minor details of construction may be resorted to without departing from the spirit or sacrificing any of the advantages of this invention.

Having described my invention, what I claim is—

1. The combination of a balance-beam pivotally mounted at an intermediate point, means for applying the weight of an article to be weighed to the short arm of the balance-beam, a horizontal fixed guide, a scale-beam carrier mounted to slide upon said guide, a scale-beam 11 mounted upon said carrier and provided at one end with a counterpoise and at the other end with a weight-supporting disk, said scale-beam having parallel correspondingly-graduated rate and price bars arranged upon the same side of its fulcrum, the graduations indicating units of currency, an index suspended from the balance-beam and having an upper point to engage said balance-beam and a lower point to engage the rate-bar of the scale-beam, an equalizing-poise arranged upon the balance-beam and adapted to be adjusted in a direction opposite to the index, and a weighing-poise supported by the price-bar, substantially as specified.

2. The combination of a balance-beam having a long arm comprising parallel members graduated in opposite directions to indicate units of weight, and extending in the same direction from the fulcrum, means for applying the weight of an article to be weighed to the short arm of the balance-beam, a pivotal scale-beam and means for adjusting the same longitudinally to vary the position in a horizontal plane of its pivot-point, said scale-beam having parallel rate and price bars correspondingly graduated to indicate units of currency, and arranged upon the same side of its pivot-point, a weighing-poise traversing the price-bar, an index engaged at its upper end with one member of the balance-beam and at its lower end with the rate-bar of the scale-beam, and an equalizing-poise arranged upon the other member of the balance-beam and adapted to be arranged upon a graduation thereof corresponding in numerical value with the graduation of the first-named member which is engaged by the index, substantially as specified.

In testimony whereof I affix my signature in presence of witnesses.

GUSTAF FLOOD.

Witnesses:
C. R. PETERSON,
PAUL × FLOOD,
   his
   mark
FRANK SWANSON.